US012618120B2

(12) United States Patent
Zeng et al.

(10) Patent No.: US 12,618,120 B2
(45) Date of Patent: May 5, 2026

(54) DIRECT REDUCTION OF IRON BY HYDROGEN PLASMA IN A ROTARY KILN REACTOR

(71) Applicant: UCHICAGO ARGONNE, LLC, Chicago, IL (US)

(72) Inventors: Zuotao Zeng, Woodridge, IL (US); John P. Kopasz, Bolingbrook, IL (US); Theodore R. Krause, Naperville, IL (US); Angel Yanguas-Gil, Northbrook, IL (US); Meimei Li, Willowbrook, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 122 days.

(21) Appl. No.: 17/957,101

(22) Filed: Sep. 30, 2022

(65) Prior Publication Data

US 2024/0110254 A1 Apr. 4, 2024

(51) Int. Cl.

| | |
|---|---|
| ***C21B 13/08*** | (2006.01) |
| ***F27B 7/10*** | (2006.01) |
| ***F27B 7/32*** | (2006.01) |
| ***F27B 7/38*** | (2006.01) |
| ***F27D 11/00*** | (2006.01) |

(52) U.S. Cl.

CPC ................ *C21B 13/08* (2013.01); *F27B 7/10* (2013.01); *F27D 11/00* (2013.01); *F27B 7/3205* (2013.01); *F27B 7/383* (2013.01)

(58) Field of Classification Search

CPC .......... C21B 13/08; F27B 7/10; F27B 7/3205; F27B 7/383; F27D 11/00

See application file for complete search history.

(56) References Cited

U.S. PATENT DOCUMENTS

| | | | | |
|---|---|---|---|---|
| 3,993,473 A | | 11/1976 | Macrae | |
| 4,160,663 A | | 7/1979 | Hsieh | |
| 4,577,838 A | | 3/1986 | Mathiesen | |
| 4,983,214 A | * | 1/1991 | Bottinelli | F27B 7/2083 266/158 |
| 6,802,709 B1 | * | 10/2004 | Mosci | F27B 7/28 432/119 |
| 8,728,195 B2 | * | 5/2014 | Bhoi | C21B 13/125 75/505 |
| 9,879,331 B2 | * | 1/2018 | Bhoi | C21C 7/00 |
| 2020/0392041 A1 | * | 12/2020 | Charmet | C04B 7/4446 |

FOREIGN PATENT DOCUMENTS

| | | | | |
|---|---|---|---|---|
| CN | 104846171 A | * | 8/2015 | |
| CN | 114737051 A | * | 7/2022 | C22B 1/216 |

OTHER PUBLICATIONS

Machine Translation of CN-104846171-A (Year: 2015).*

Bhoi, B., Behera, P.R., Paramguru, R.K. et al. Hydrogen Plasma Smelting Reduction of Fe2O3. Metall Mater Trans B 50, 262-270 (2019) (Year: 2019).*

(Continued)

*Primary Examiner* — John A Hevey

(74) *Attorney, Agent, or Firm* — Foley & Lardner LLP

(57) ABSTRACT

A hydrogen-plasma rotary kiln furnace reactor and a method of reducing iron ore to iron using the same are disclosed. The hydrogen-plasma rotary kiln furnace includes a rotary kiln furnace and a hydrogen-plasma generator.

20 Claims, 2 Drawing Sheets

(56) References Cited

OTHER PUBLICATIONS

CN-114737051-A, machine translation. (Year: 2022).*
Ahman, et al., "Hydrogen steelmaking for a low-carbon economy: A joint LU-SEI working paper for the HYBRIT project," Environmental and Energy Systems Studies, Lund University, EESS Report No. 109, 29 pages (2018).
Argonne National Laboratory, "Three Argonne projects awarded for novel clean energy technology," retrieved from https://www.anl.gov/article/three-argonne-projects-awarded-for-novel-clean-energy-technology, 4 pages (2022).
Bhaskar, et al., "Can methane pyrolysis based hydrogen production lead to the decarbonisation of iron and steel industry?," Energy Conversion and Management: X 10:100079, 15 pages (2021).
Dey, et al., "Energy survey of the coal based sponge iron industry," Case Studies in Thermal Engineering 6, pp. 1-15 (2015).
Liu, et al., "The production and application of hydrogen in steel industry," International Journal of Hydrogen Energy 46(17), pp. 10548-10569 (2021).
Midrex, "2020 World Direct Reduction Statistics," retrieved from https://www.midrex.com/wp-content/uploads/Midrex-STATSbookprint-2020.Final_.pdf, 15 pages (2021).
Midrex, "DRI Products & Applications: Providing flexibility for steelmaking," retrieved from https://www.midrex.com/wp-content/uploads/MIdrexDRI_ProductsBrochure_4-12-18-1.pdf, 16 pages (2018).
Rechberger, et al., "Green Hydrogen-Based Direct Reduction for Low-Carbon Steelmaking," Steel Research International 91(11):2000110, 10 pages (2020).
Sabat & Murphy, "Hydrogen Plasma Processing of Iron Ore," Metallurgical and Materials Transactions B 48, pp. 1561-1594 (2017).
Sabat, "Iron production by hydrogen plasma," Journal of Physics: Conference Series 1172:012043, 5 pages (2019).
Seftejani & Schenk, "Fundamentals of hydrogen plasma smelting reduction (HPSR) of iron oxides, a new generation of steelmaking processes," Asia Steel International Conference, 4 pages (2018).
Seftejani, et al., "Reduction of Haematite Using Hydrogen Thermal Plasma," Mateirals 12(10):1608, 22 pages (2019).
Sing & Jain, "A study on the accretion formation in DRI kilns and possible ways for its reduction," IOSR Journal of Mechanical and Civil Engineering 12(6), pp. 98-103 (2015).
Sohn & Olivas-Martinez, "Methods for Calculating Energy Requirements for Processes in Which a Reactant Is Also a Fuel: Need for Standardization," JOM 66, pp. 1557-1564 (2014).
Spreitzer & Schenk, "Reduction of Iron Oxides with Hydrogen—A Review," 90(10):1900108, 17 pages (2019).
Tang, et al., "Development and progress on hydrogen metallurgy," International Journal of Minerals, Metallurgy and Materials 27, pp. 713-723 (2020).
Vogl, et al., "Assessment of hydrogen direct reduction for fossil-free steelmaking," Journal of Cleaner Production 203, pp. 736-745 (2018).

* cited by examiner

DIRECT REDUCTION OF IRON BY HYDROGEN PLASMA IN A ROTARY KILN REACTOR

This invention was made with government support under Contract No. DE-AC02-06CH11357 awarded by the United States Department of Energy to UChicago Argonne, LLC, operator of Argonne National Laboratory. The government has certain rights in the invention.

TECHNICAL FIELD

The present disclosure relates generally to an eco-friendly method for producing iron with zero-CO2 emission. More specifically, the present disclosure describes methods for producing iron with zero CO2 emission using hydrogen plasma and/or hydrogen with rotary kiln furnace, and a hydrogen-plasma rotary kiln furnace used therein.

BACKGROUND

Conventional steel manufacturing is not an environmentally friendly process. Globally, the steel industry emits more than 3.3 billion tons of carbon dioxide ("$CO_2$") annually, which accounts for 30% of the global industrial and 8% of the global total $CO_2$ emissions. Of various steps in the steel manufacturing process, the blast furnace process for reducing iron ore to metallic iron accounts for about one-third of the total $CO_2$ emissions.

Specifically, during the blast furnace process, iron ore is reduced using coke and limestone at temperatures above 2,000° C. to create molten pig iron. Pig iron has a high carbon content, approximately 4-5%, which makes it brittle. To reduce the carbon content, pig iron is processed in the basic oxygen furnace by treating it with pure oxygen using a water-cooled lance, which then removes the carbon as $CO_2$, yielding a crude steel product. Additional processing may further be utilized to produce a high-grade steel product.

However, conventional steel manufacturing processes operate close to their thermodynamics limit, making it difficult to meet the goals set in the Paris Agreement adopted on Dec. 12, 2015. Furthermore, conventional steel manufacturing process requires high energy consumption. Conventional blast furnace process requires operation of the furnace at a temperature above 1550° C. A substantial amount of energy is lost in the sensible heat of the high temperature iron and slag.

Many have attempted to solve the issues addressed above with new processes, including direct reduced iron ("DRI") processes, which offer the advantages of lower capital cost, complexity in design, operation compared to conventional blast furnace processes. Currently, about 100 million tons of steel are produced annually by various DRI processes.

As an example, the MIDREX DRI process uses a shaft furnace as the reactor and pellets or lump ore as the raw material. The DRI shaft furnace requires that the iron ore be fed into the reactor in pellet form. While the MIDREX DRI process allows a lower carbon footprint compared to the traditional blast furnace process, further reductions in the required energy and resulting carbon footprint are desired. In addition, the MIDREX DRI has disadvantages in that pelletizing the iron ore adds additional cost and produces about 200 kg of $CO_2$ per ton of steel. Furthermore, shaft furnaces cannot match the production rate of blast furnaces due to sticking, fusion of particles, and pellet disintegration.

Another DRI process studied is directed to producing sponge iron using a rotary kiln furnace. However, the DRI-rotary kiln furnace process uses coal as the reducing agent. The process burns coal with air to obtain heat for the iron ore reduction, and because of the high nitrogen content in air, the flue gas contains a substantial amount of nitrogen that carries a lot of heat out of the reactor. That is, the DRI-rotary kiln furnace process does not provide efficiency advantages compared to the blast furnace technology.

Iron reduction by hydrogen plasma has also been studied. Hydrogen plasma provides advantages thermodynamically and kinetically for reducing iron oxide compared to thermal processes utilizing hydrogen, because the plasma can generate monoatomic (H·), ionic (H+) species, and energetic rotationally- and vibrationally-excited molecular hydrogen states ($H_2$*). The energy carried by these species is released at the reduction interface leading to localized heating. Thus, a hydrogen plasma does not require volumetric heating as is required with thermal processes, which reduces heat loss from the reactor and subsequently reduces cost. The reduction of $Fe_2O_3$ to $Fe_3O_4$ and $Fe_3O_4$ to FeO by molecular $H_2$ are thermodynamically favorable at temperatures above 900 K (627° C.). However, the reduction of FeO to Fe with molecular $H_2$ is thermodynamically unfavorable. All three reduction processes become favorable in a hydrogen plasma due to the presence of plasma-generated monoatomic (H·) and ionic (H+) hydrogen that can be generated at relatively low temperatures.

The above described iron reduction by hydrogen plasma is not free of disadvantages. For example, ionizing hydrogen to plasma requires a lot of energy, and after the hydrogen plasma reduces iron ore, a lot of heat is released. Previous studies have not considered recovering the heat after the hydrogen plasma reaction with iron ore. Therefore, the energy efficiency of the previous studies of the hydrogen plasma process is low.

SUMMARY

Certain embodiments described herein relate generally to a hydrogen-plasma rotary kiln furnace reactor. The reactor comprises a rotary kiln furnace and a hydrogen-plasma generator.

Certain embodiments described herein relate generally to a method of reducing iron using a hydrogen-plasma rotary kiln furnace reactor. The reactor comprises a rotary kiln furnace and a hydrogen-plasma generator.

Certain embodiments described herein relate generally to a method of reducing iron. The method comprises feeding iron ore and/or iron ore concentrate to a rotary kiln furnace, and reducing iron ores to iron using hydrogen gas and a hydrogen plasma.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are not, therefore, to be considered limiting of its scope, the disclosure will be described with additional specificity and detail through use of the accompanying drawings.

Figure 1A:
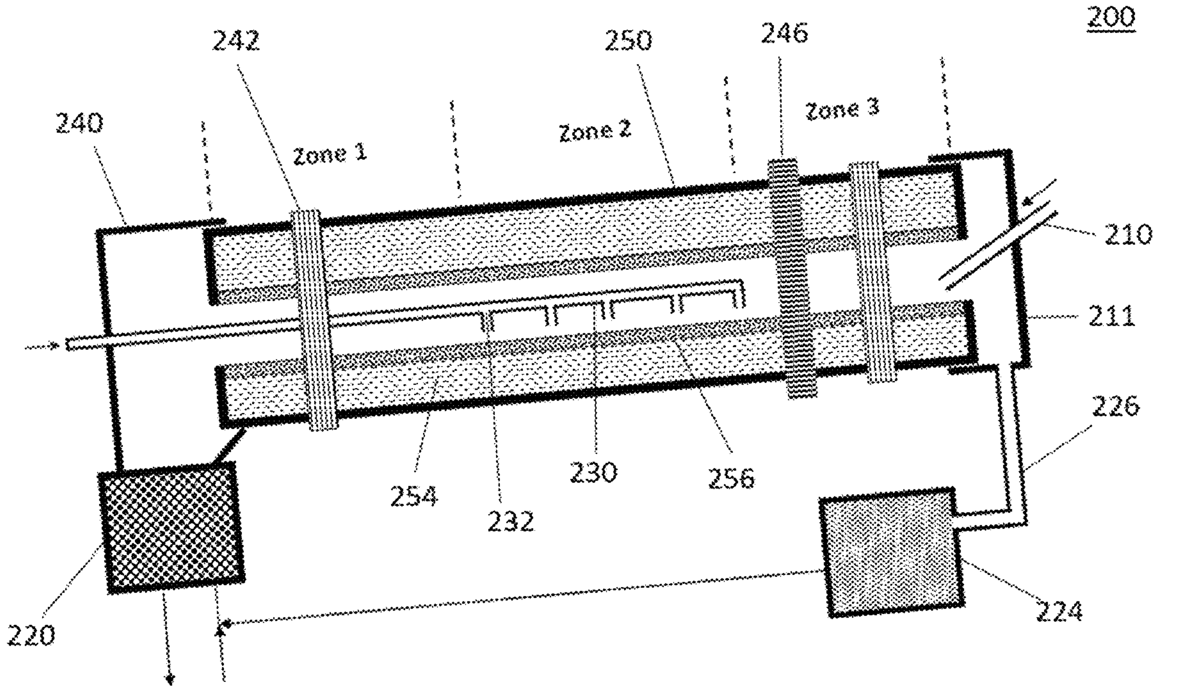
FIG. 1A shows a schematic diagram of a hydrogen-plasma rotary kiln furnace reactor according to one embodiment of the present disclosure.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

As used herein "room temperature" shall mean temperatures within 15 to 40° C.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

The majority of processes attempting to reduce the carbon footprint of the iron ore reduction step use molecular hydrogen along with varying amounts of some form of carbon (e.g. coke, coal, natural gas, or carbon monoxide). The method of reducing iron ore disclosed herein provides a carbon-free reduction of iron ore using a combination of direct hydrogen gas reduction of iron ore in a rotary kiln furnace with a low temperature hydrogen plasma reduction process.

Reduction of iron ore or iron ore concentrate generally follows successive reaction steps. For instance, hematite from iron ore is reduced to magnetite ($3Fe_2O_3+CO/H_2 \rightarrow 2Fe_3O_4+CO_2/H_2O$), magnetite is then reduced to ferrous oxide ($Fe_3O_4+CO/H_2 \rightarrow 2FeO+CO_2/H_2O$), and ferrous oxide is reduced to iron in carbon monoxide or hydrogen ($FeO+CO/H_2 \rightarrow Fe+CO_2/H_2O$). The hydrogen plasma, with its high concentration of highly reactive atomic and ionic hydrogen, provides favorable thermodynamics and kinetics in the reduction of ferrous oxide to iron (that is, the reduction of FeO to Fe). The hydrogen plasma further provides improved kinetics for prior reduction steps including the reduction of $Fe_2O_3$ to $Fe_3O_4$ and of $Fe_3O_4$ to FeO. Further, the hydrogen plasma also provides thermal energy. More specifically, the plasma provides local heating to the ore, thus reduces heating demands compared to traditional approaches that require volumetric heating. In other words, compared to conventional techniques, using a hydrogen plasma is advantageous for its lower operating temperature while serving as an excellent heat source, providing increased reaction rates, and more favorable thermodynamic driving forces.

On the other hand, the rotary kiln furnace allows collection and utilization of the thermal energy in the plasma for the initial stages of iron ore reduction by molecular hydrogen. The rotation of the rotary kiln provides mixing that exposes new particle surfaces at the plasma-particle interface, thereby improving the overall reaction rate. Advantages of using a rotary kiln furnace include elimination of the need for pelletizing the iron ore, efficient recovery of plasma waste energy, better mixing of the ore to improve solid-gas contact and reduce reaction times, and better control over the ore flow rate and residence time.

The method and reactor disclosed herein combines the advantages of hydrogen plasma and rotary kiln furnace, and improves energy efficiency compared to conventionally available techniques such as blast furnace processes or DRI processes. The improved energy efficiency compared to the conventionally available techniques allows use of the smaller sized reactor, thereby also reducing the capital cost associated with using the invention.

In one embodiment, iron ore is reduced to iron in a hydrogen-plasma rotary kiln furnace reactor, which will be described further below.

FIG. 1A shows a schematic diagram of a hydrogen-plasma rotary kiln furnace reactor according to one embodiment of the present disclosure. In one embodiment, the hydrogen-plasma rotary kiln furnace reactor comprises 200 a rotary kiln furnace body 250 and a hydrogen-plasma generator 230. More specifically, the rotary kiln furnace body 250 includes a hollow and cylindrical furnace body elongated in a substantially horizontal direction and the hydrogen-plasma generator 230 disposed inside the furnace body 250.

In some embodiments, in accordance with the elongated furnace body 250, the hydrogen-plasma generator 230 may also be elongated. In other embodiments, the hydrogen-plasma generator 230 may be disposed in an elongated tube. More specifically, as shown in FIG. 1B, the hydrogen-plasma generator 230 may be disposed substantially coaxially inside the furnace body 250.

Figure 1B:
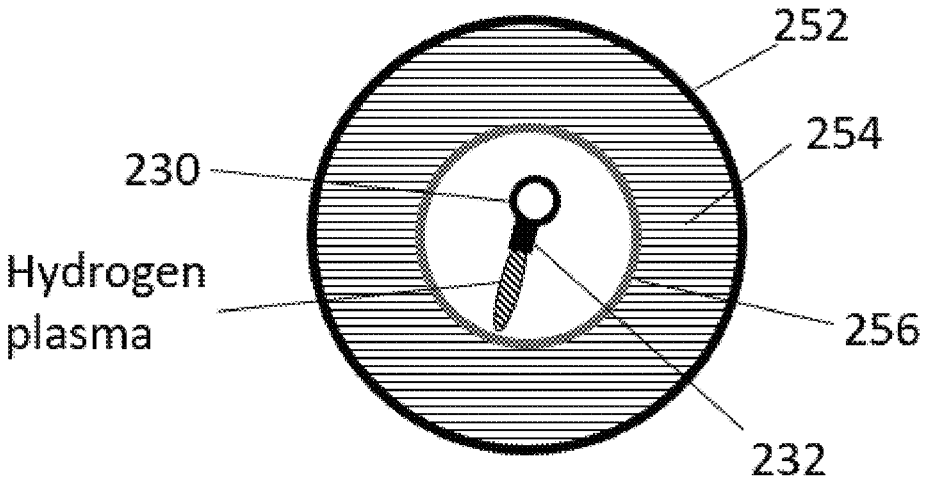
FIG. 1B shows a cross-sectional view of a hydrogen-plasma rotary kiln furnace reactor according to one embodiment of the present disclosure.

FIG. 1B shows a cross-sectional view of a hydrogen-plasma rotary kiln furnace reactor according to one embodiment of present disclosure. As shown in FIG. 1B, the furnace body 250 may be comprised of a shell 252, a thermal insulator 254, and a liner 256, each configured in elongated and cylindrical tube with a hollow space. In some embodiments, the shell 252 forms the outermost layer of the furnace body 250 and the liner 256 forms the innermost layer of the furnace body 250. The thermal insulator 254 is disposed adjacent to and between the shell 252 and the liner 256 to minimize heat loss during the process. In other embodiments, the thermal insulator 254 may be disposed outside the shell 252. In such configuration, the thermal insulator 254 forms the outermost layer of the furnace body 250, the liner 256 forms the innermost layer of the furnace body 250, and the shell 252 is disposed between the thermal insulator 254 and the liner 256. In either embodiments, the liner 256, the insulator 254, and the shell 252 together form an elongated and cylindrical body with a hollow space extending therein, with the liner 256 forming an inner hollow space. The hydrogen-plasma generator 230 may be disposed approximately coaxially inside the inner hollow space.

The shell, liner, and thermal insulators may be selected from any materials considered suitable by a person of ordinary skill in the art. For example, commercially available furnace shells are often made of various metals such as carbon steel, stainless steel, aluminized steel, aluminum, etc. In one embodiment, the shell may be a steel shell.

The thermal insulator and liner should inhibit heat transfer to the external environment, but there may be additional requirements such as thermal-shock resistance, resistance to corrosion, physical strength, and/or flexibility. Commonly used thermal insulator materials and liners include refractory ceramic fibers, alkaline earth silicate fibers, polycrystalline fibers, high-temperature fibers with firebricks, or any combinations thereof. Depending on desired properties, any materials may be chosen as considered suitable by a person of ordinary skill in the art. In one embodiment, the liner may be a ceramic liner.

Referring back to FIG. 2A, the reactor 200 may further include an end cap 211 at a first end of the furnace body 250, and a kiln hood 240 connected to a second end of the furnace body 250. The first end and second end are disposed on the opposite ends of the furnace body 250. The reactor 200 may further include rotary sealer (not shown) to connect the end cap 211 and kiln hood 240 to the furnace body 250 while preventing ambient air from entering the reactor 200. Furthermore, while the end cap 211 and kiln hood 240 are connected to the furnace body 250, the end cap 211 and kiln hood 240 would be fixed in a position such that while they do not rotate while holding the rotating furnace body 250. The kiln hood 240 may further be configured to receive the hydrogen-plasma generator 230 or a tube containing the hydrogen-plasma generator 230 such that the hydrogen-plasma generator 230 can be disposed inside the furnace body 250. The furnace body 230, kiln hood 240, and end cap 211 may be assembled such that the furnace body is inclined at an angle between 1° and 15° with respect to a horizontal axis, the first end of the furnace body 250 connected to the end cap 211 positioned to be higher than the second end of the furnace body 250 connected to the kiln hood 240. In one embodiment, the furnace body 250 may rotate at a rate of 3 rpm to 15 rpm. Such inclination or rotational rate parameters are exemplary only and may be further modified as desired and considered suitable by a person of ordinary skill in the art.

The reactor may further include a feeder 210, a sponge iron cooler 220, a water-hydrogen separator 224, and an exhaust gas outlet 226. In one embodiment, the feeder 210 connected to the end cap 211 and is configured to feed iron ore or iron ore concentrate into the furnace body 250. The sponge iron cooler 220, which is configured to cool the sponge iron, may be connected to the kiln hood 240. In one embodiment, the reactor 200 may further include an exhaust gas outlet 226, which is configured form a passageway for exhaust gas to exit the furnace body and to connect the first end of the furnace body 250 and a water-hydrogen separator 224. The water-hydrogen separator 224 connected to the exhaust gas outlet 226 condenses steam from exhaust gas.

The hydrogen-plasma generator 230 may include a plurality of jet nozzles 232 configured to discharge hydrogen plasma jets. The plurality of jet nozzles may be disposed along the body of the hydrogen-plasma generator 230 at a distance from each other. While FIGS. 1A-B illustrate that the jet nozzles 232 are generally directed downwardly facing bottom of the furnace body 250, a person of ordinary skill in the art would easily understand that the jet nozzles 232 may be directed in other directions as desired and considered suitable by a person of ordinary skill in the art.

In one embodiment, hydrogen plasma is generated along only a portion of the furnace body 250. Because hydrogen plasma is not generated throughout the entirety of the furnace body 250, different processes may occur within the furnace body. For the purposes of description herein, Zone 1 is defined as a region of the furnace body 250 from the second end that is connected to the kiln hood 240 to an end of the hydrogen-plasma generator 230 that is the closest to the second end of the furnace body 250. Zone 2 is defined as a region of the furnace body 250 in which the hydrogen-plasma generator 230 is disposed. Zone 3 is defined as a region of the furnace body 250 from the first end that is connected to the feeder 210 to an end of the hydrogen-plasma generator 230 that is the closest to the first end of the furnace body 250.

In one embodiment, in Zone 3, iron ore is fed into the furnace body 250 and exchanges heat with exhaust gas consisting of hydrogen and steam. Further in Zone 3, initial stages of reduction, including reduction of hematite to magnetite and reduction of magnetite to ferrous oxide, of the ore with molecular hydrogen occur. As discussed above, the furnace body 250 is inclined at an angle, generally between approximately 1° and 15°. Due to the inclination of the furnace body 250, iron ore powder can move from Zone 3 toward Zone 1 slowly. By controlling the incline and the rotation rate, the ore flow rate can be controlled. The ore subsequently moves from Zone 3 to Zone 2.

In Zone 2, iron ore is reduced to sponge iron by using hydrogen plasma, and hydrogen is oxidized to steam. During the operation, the temperature of the kiln furnace in Zone 2 may be heated up to 1550° C. at approximately 1 atm. Compared to conventional processes that use molecular hydrogen, a hydrogen plasma allows processing at a lower temperature range because hydrogen species in plasma status are much more active than regular hydrogen molecules. The reduction using a hydrogen plasma generates excess heat, which can be used to supply thermal energy required to carry out the chemical reduction process. Absent the excess heat generated by a hydrogen plasma, additional energy is required to keep the reaction at the required temperature in the reactor at approximately 1 atm.

Finally, the reduced sponge iron flows from Zone 2 to Zone 1 and into the sponge iron cooler 220, where it is cooled by hydrogen gas near the inlet of the hydrogen-plasma generator 230.

Hydrogen flows counter-current to the sponge iron and ore flow. In one embodiment, in Zone 1, hydrogen gas exchanges heat with the sponge iron. More specifically, heat transfers from the sponge iron to hydrogen gas in Zone 1, cooling down the sponge iron while heating up hydrogen gas.

Furthermore, hydrogen is fed from two positions, from the sponge iron cooler 220 and from the inlet for the hydrogen-plasma generator 230. That is, at least some hydrogen gas introduced from Zone 1 is conducted to the Zone 2. The amount of hydrogen fed from two positions and thus the resulting balance of flow may be varied.

In the reduction process, hydrogen is consumed and steam ($H_2O$) is formed. In one embodiment, the reduction reaction is carried out with excess $H_2$, leaving residual hydrogen in the flow. The hydrogen fed from the sponge iron cooler 220 cools and collects residual thermal energy from the reduced iron, and is further used to reduce the iron ores. The hydrogen fed from the hydrogen-plasma generator 230 flows through the plasma jets and is converted to plasma in Zone 2. Further in Zone 2, the thermal energy from the hydrogen plasma is exchanged with the iron ores and with the hydrogen that was introduced from the sponge iron cooler 220. Such exchange of thermal energy provides energy for the reduction of iron oxide by molecular hydrogen.

In some embodiments, an additional gas without carbon substituents may be added to the hydrogen entering the plasma generator to adjust or alter plasma characteristics and stability. The additional gas may be a noble gas such as argon, and may be utilized for only a portion of the operational time, for example at the reactor startup, or for the duration of the process.

The gas flow exiting Zone 2 comprises of the residual hydrogen flow, combined of hydrogen fed from the sponge iron cooler 220 and hydrogen fed from the hydrogen-plasma generator 230, and steam formed during the reduction reaction. The steam and hydrogen flow that exited Zone 2 provide thermal energy to the iron ore entering Zone 3. Because hydrogen is consumed in the reactions in Zone 2, in Zone 3, steam is prevalent and only residual amounts of hydrogen remain. As discussed above, initial stages of reduction from the residual amounts of molecular hydrogen remaining will occur in Zone 3. However the amount of reduction will be limited by the steam present and the reduced hydrogen content. Exhaust gas exits the furnace body 250 and is transferred to the water hydrogen separator 224 through the exhaust gas outlet 226. Steam of the exhaust gas is condensed in the water-hydrogen separator 224, which is configured to transfer recycled hydrogen back to the sponge iron cooler 220.

In some embodiments, the reactor 200 may further include a drive assembly 246 configured to rotate the furnace body 250. For example, in some embodiments, the drive assembly 246 may be a gear drive. A drive gear includes a plurality of gears, including a gear wrapped around the furnace body 250. The gear wrapped around the furnace body 250 meshes with a small gear drive (not shown), which then drives rotation of the furnace body 250. While drive gear may be preferable because it is suitable for heavy-duty applications requiring high horsepower, other mechanisms may be used depending on desired operation scale. For example, other mechanisms may include chain and sprocket drive, friction drive, direct drive, and etc. In some embodiments, the reactor 200 may further include a plurality of tyres 242 attached to the furnace body 250. The tyres 242 are configured to transfer the gravity of the furnace body to supporting rollers (not shown) and allow the furnace body rotate smoothly on the supporting rollers.

Figure 2:
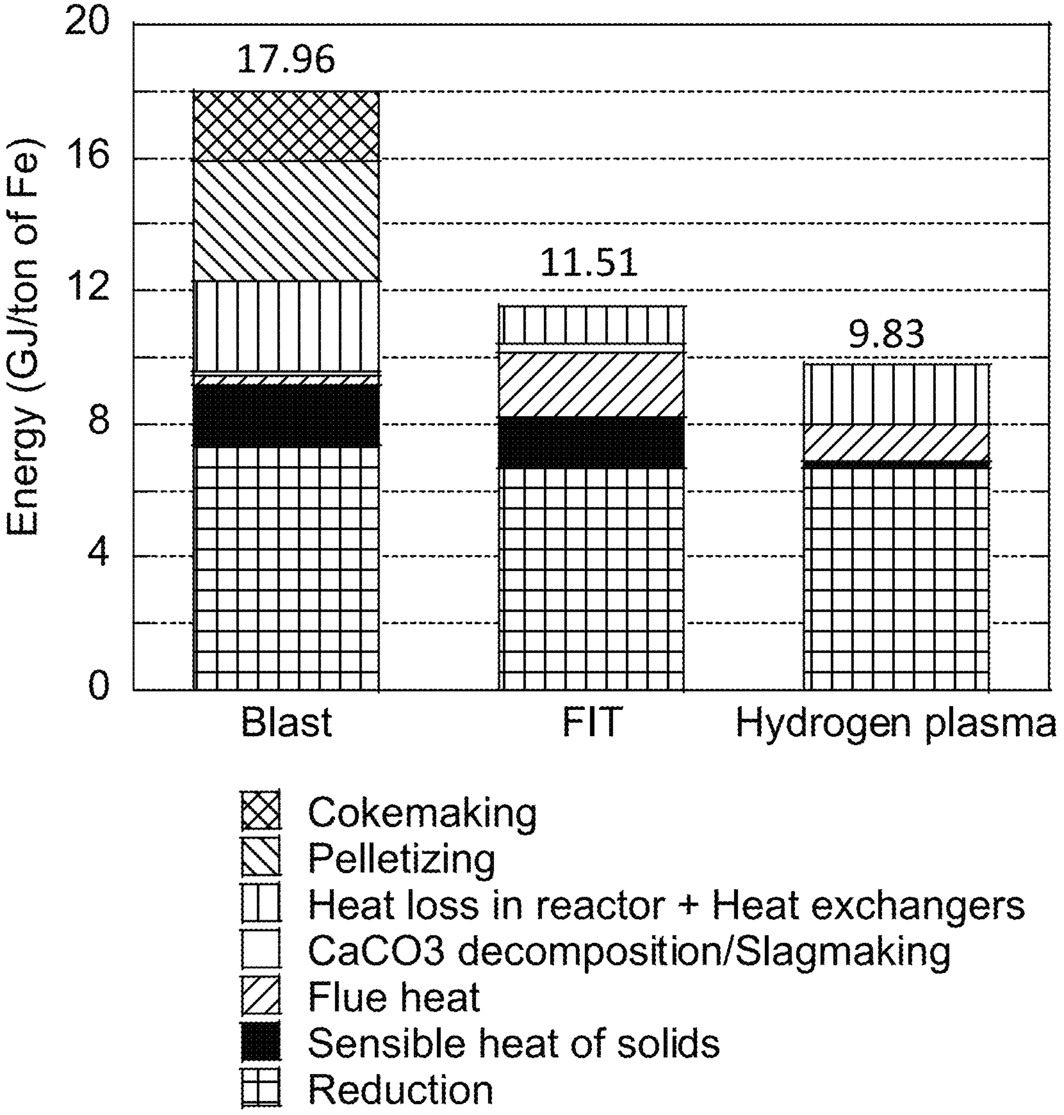
FIG. 2 shows a comparison of energy consumption of conventional blast furnace, in-flight reduction processes, and hydrogen-plasma-kiln process according to one embodiment of the present disclosure.

FIG. 2 compares estimates of the energy consumption of commercial blast furnace and flash ironmaking processes and hydrogen-plasma-rotary kiln process. The operating temperature of the flash ironmaking process, which uses hydrogen gas, is higher than the operating temperature of our hydrogen-plasma-rotary kiln process disclosed herein. In the flash ironmaking processes, gas flow is concurrent with iron particles. In the blast furnace, calcium carbonate ($CaCO_3$) is added to remove sulfur from coal. The present hydrogen-plasma-rotary kiln process does not require adding $CaCO_3$ because hydrogen contains no sulfur. Furthermore, in the present hydrogen-plasma-rotary kiln process, the outlet temperature of iron may be reduced below 300° C. through heat exchanging with incoming cold hydrogen, because the hydrogen gas flow is countercurrent to the iron particle flow in the presently disclosed system. Therefore, the sensible heats of iron and slag in the present hydrogen-plasma-rotary kiln process are lower than that for the flash ironmaking processes and blast furnace. The lower operating temperature and lower volume results in less heat loss from the surface of the reactors. Thus, the energy consumption of the presently disclosed hydrogen-plasma-rotary kiln process may be reduced to <10 GJ/ton iron.

The invention disclosed herein is advantageous in several aspects. For instance, the method disclosed herein only uses hydrogen gas as a reducing agent. Because the process does not use solid carbonaceous fuel as a reducing agent, the process is a zero-$CO_2$ emission. Furthermore, use of plasma allows reduction of iron ores at a lower temperature compared to processes using molecular hydrogen, which is highly endothermic and thus requires high operating temperatures. Furthermore, the process does not require making iron ore pellets. Thus, less energy consumption is achieved, and the operating and capital costs may be reduced. The invention disclosed here in is estimated to reduce energy consumption by approximately 45% compared to the conventional blast furnace process and by approximately 15% compared to DRI process.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

We claim:

1. A method of reducing iron with zero-$CO_2$ emission, the method comprising:
- reducing iron ore or iron ore concentrate to iron at a pressure in a range of 0.9 atm to 1.1 atm in a hydrogen-plasma rotary kiln furnace reactor, wherein the reactor comprises:
  - a rotary kiln furnace including a hollow and cylindrical furnace body elongated along a first axis, the furnace body comprising:
    - a first zone, a second zone, and third zone, the second zone located between the first zone and the third zone; and
    - a liner forming an innermost layer of the furnace body;
  - a hydrogen-plasma generator, wherein heat dissipated by the hydrogen-plasma generator is reused for further reduction of the iron ore or iron ore concentrate;
  - wherein the hydrogen-plasma generator is disposed in the second zone and the liner is disposed around the hydrogen-plasma generator, the hydrogen-plasma generator configured to generate hydrogen plasma, the hydrogen plasma configured to flow towards the third zone; and
  - wherein the iron ore or iron ore concentrate is configured to move down an incline from the third zone to the first zone, and reduction of the iron ore or iron ore concentrate to iron occurs in the second zone.

2. The method of claim 1, wherein the hydrogen-plasma generator is disposed substantially coaxially inside the furnace body.

3. The method of claim 1, wherein the rotary kiln furnace comprises:
- a shell; and
- a thermal insulator.

4. The method of claim 1, wherein the rotary kiln furnace is inclined at an angle of 1° to 15° with respect to a horizontal axis.

5. The method of claim 1, wherein the rotary kiln furnace rotates at a rate of 3 rpm to 15 rpm.

6. The method of claim 1, wherein the iron ore or iron ore concentrate is reduced to iron at a temperature lower than 1550° C. at approximately 1 atm.

7. A method of claim 1, wherein the iron ore or iron ore concentrate is reduced at a temperature lower than or equal to 1000° C. at approximately 1 atm.

8. The method of claim 1, wherein the hydrogen-plasma generator comprises a plurality of jet nozzles disposed along the first axis, the plurality of jet nozzles configured to discharge the hydrogen plasma.

9. The method of claim 1, wherein the iron ore or iron ore concentrate is reduced to iron at a temperature less than or equal to 800° C. at approximately 1 atm.

10. The method of claim 1, wherein the rotary kiln furnace rotates at a rate of 3 rpm to 25 rpm.

11. The method of claim 1, further comprising continuously producing the iron by reducing the iron ore or iron ore concentrate.

12. The method of claim 1, wherein the reactor does not emit $CO_2$.

13. The method of claim 1, wherein the reactor comprises:
- an end cap connected to a first end of the furnace body; and
- a kiln hood connected to a second end of the furnace body and configured to receive the hydrogen-plasma generator such that the hydrogen-plasma generator is disposed inside the furnace body,
- wherein the second end is opposite to the first end, and
- wherein both the end cap and the kiln hood are fixedly configured such that they do not rotate while allowing rotation of the furnace body.

14. The method of claim 1, wherein the reactor comprises:
- a feeder connected to an end cap and configured to feed iron ores or iron ore concentrate into the furnace body;
- an exhaust gas outlet connected to the end cap;
- a water-hydrogen separator connected to the exhaust gas outlet; and
- a sponge iron cooler connected to kiln hood,
- wherein the water-hydrogen separator is configured to transfer recycled hydrogen to the sponge iron cooler.

15. The method of claim 1, wherein the iron ore or iron ore concentrate is reduced to iron at a temperature less than or equal to 600° C.

16. The method of claim 1, wherein the iron ore or iron ore concentrate is reduced to iron at a temperature less than 570° C.

17. The method of claim 1, wherein flowing the hydrogen plasma from the second zone to the third zone and moving the iron or iron ore concentrate from the third zone to the first zone allows for utilization of the heat to initiate hydrogen reduction of the iron or iron ore concentrate.

18. A method of reducing iron with zero-$CO_2$ emission, the method comprising:
- reducing iron ore or iron ore concentrate to iron at a pressure in a range of 0.9 atm to 1.1 atm in a hydrogen-plasma rotary kiln furnace reactor, wherein the reactor comprises:
  - a rotary kiln furnace including a hollow and cylindrical furnace body elongated along a first axis;
  - a hydrogen-plasma generator, wherein heat dissipated by the hydrogen-plasma generator is reused for further reduction of the iron ore or iron ore concentrate;
  - a feeder connected to an end cap and configured to feed the iron ore or iron ore concentrate into the furnace body;
  - an exhaust gas outlet connected to the end cap;
  - a water-hydrogen separator connected to the exhaust gas outlet; and
  - a sponge iron cooler connected to a kiln hood,
  - wherein the water-hydrogen separator is configured to transfer recycled hydrogen to the sponge iron cooler.

19. The method of claim 18, further comprising continuously producing the iron by reducing the iron ore or iron ore concentrate.

20. A method of reducing iron with zero-$CO_2$ emission, the method comprising:
- reducing iron ore or iron ore concentrate to iron at a pressure in a range of 0.9 atm to 1.1 atm in a hydrogen-plasma rotary kiln furnace reactor, wherein the reactor comprises:
  - a rotary kiln furnace including a hollow and cylindrical furnace body elongated along a first axis;
  - a hydrogen-plasma generator, wherein heat dissipated by the hydrogen-plasma generator is reused for further reduction of the iron ore or iron ore concentrate;

an end cap connected to a first end of the furnace body; and a kiln hood connected to a second end of the furnace body and configured to receive the hydrogen-plasma generator such that the hydrogen-plasma generator is disposed inside the furnace body, wherein the second end is opposite to the first end, and wherein both the end cap and the kiln hood are fixedly configured such that the end cap and the kiln hood do not rotate while allowing rotation of the furnace body.

* * * * *